(12) United States Patent
Fu et al.

(10) Patent No.: US 10,338,663 B2
(45) Date of Patent: Jul. 2, 2019

(54) ENERGY SAVING METHOD AND APPARATUS OF MOBILE TERMINAL

(71) Applicant: Samsung Electronics Co., Ltd., Suwon-si, Gyeonggi-do (KR)

(72) Inventors: Mijing Fu, Xi'an (CN); Chuangqi Tang, Xi'an (CN); Wenhui Qiang, Xi'an (CN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 115 days.

(21) Appl. No.: 15/357,403

(22) Filed: Nov. 21, 2016

(65) Prior Publication Data
US 2017/0242470 A1  Aug. 24, 2017

(30) Foreign Application Priority Data
Feb. 18, 2016 (CN) .......................... 2016 1 0091351

(51) Int. Cl.
| | | |
|---|---|---|
| G06F 1/00 | (2006.01) | |
| G06F 1/26 | (2006.01) | |
| G06F 1/32 | (2019.01) | |
| G06F 1/324 | (2019.01) | |
| G06F 1/3206 | (2019.01) | |

(52) U.S. Cl.
CPC ............ *G06F 1/324* (2013.01); *G06F 1/3206* (2013.01); *Y02D 10/126* (2018.01)

(58) Field of Classification Search
CPC ........................................................ G06F 1/32
See application file for complete search history.

(56) References Cited

U.S. PATENT DOCUMENTS

| | | | | |
|---|---|---|---|---|
| 2005/0076253 A1* | 4/2005 | Lu | .......................... | G06F 1/3203 713/320 |
| 2011/0060925 A1* | 3/2011 | Park | ...................... | G06F 1/3203 713/300 |
| 2012/0017274 A1* | 1/2012 | Schrecker | ............. | G06F 21/577 726/22 |

(Continued)

FOREIGN PATENT DOCUMENTS

| | | |
|---|---|---|
| CN | 101609471 A | 12/2009 |
| CN | 102810195 A | 12/2012 |

*Primary Examiner* — Mohammed H Rehman
(74) *Attorney, Agent, or Firm* — Harness, Dickey & Pierce, P.L.C.

(57) ABSTRACT

Energy saving methods and apparatuses of a mobile terminal may be provided, For example, an energy saving method includes monitoring whether the mobile terminal loads a webpage data stream, determining webpage complexity of the webpage data stream, when the webpage data stream is loaded, determining one or more set parameter values, from among a plurality of parameter values of a set of regulation parameters, based on a correspondence relationship among the regulation parameters used for adjusting a frequency of a processor, setting one or more set regulation parameters based on the one or more set parameter values, adjusting the frequency of the processor based on the one or more set regulation parameters, and loading the webpage data stream at the adjusted frequency such that the mobile terminal completes loading of the webpage data stream in a set time range with reduced energy consumption may be provided.

18 Claims, 2 Drawing Sheets

(56) References Cited

U.S. PATENT DOCUMENTS

| | | | |
|---|---|---|---|
| 2016/0261475 A1* | 9/2016 | Jadhav | G06F 17/30861 |
| 2017/0063653 A1* | 3/2017 | Kieviet | H04L 41/0246 |
| 2017/0149633 A1* | 5/2017 | Arulesan | H04L 43/04 |
| 2017/0164290 A1* | 6/2017 | Arulesan | H04W 52/0251 |

* cited by examiner

ENERGY SAVING METHOD AND APPARATUS OF MOBILE TERMINAL

CROSS-REFERENCE TO RELATED APPLICATIONS

This application claims priority under 35 U.S.C. § 119 to Chinese Patent Application No. 201610091351.7, filed on Feb. 18, 2016, in the State Intellectual Property Office of the P.R.C., the disclosures of each of which are incorporated herein in their entirety by reference.

BACKGROUND

1. Technical Field

The present disclosure relates to controlling power consumption of a mobile terminal, and more particularly, relates to energy saving methods and/or apparatuses of a mobile terminal.

2. Description of the Related Art

With development of a network technology, a communication technology and/or a digital signal processing technology, people often access the Internet to browse information on the Internet through a mobile terminal (e.g., a smart phone, a personal computer, a panel computer, a game console, or a digital multi-media player). For example, a webpage may be opened through a browser application installed in the mobile terminal, so as to view content (e.g., news or a message). Information on a circle of friends may be opened through various network communication applications (e.g., a QQ application or a WeChat application) to view various kinds of information issued by the friend. Various shopping pages may be opened through various shopping applications (e.g., a Taobao application or a JD application) to view various kinds of commodity information.

However, limited battery capacity limits usage time duration of the mobile terminal and affects user experience of various applications. At present, energy saving of the mobile terminal is mainly implemented by optimizing an application program or closing a background program. But not all application program developers pay attention to optimization of application program energy consumption. Thus, a way of closing such application program running in the background may affects user experience, and thus may increase energy consumption of the mobile terminal to close the application program especially when the application program is configured to be automatically activated frequently. Various browsers such as a NetEase browser, a Google browser, or a Qihoo 360 browser are currently on the market. Some technologies are devoted to optimizing an internal source code of a browser (e.g., optimizing "webkit") of such browsers. However, optimizing a "webkit" mechanism for controlling power consumption is only applicable for a browser which employs a webkit-based engine. Thus, for the browsers which do not employ the web-kit based engine, this energy saving approach (e.g., an approach of optimizing a webkit mechanism) is not applicable. In other words, existing energy saving methods of a mobile terminal tend to have a limited applicability, less precision, and/or less energy efficiency.

SUMMARY

Some example embodiments of the present disclosure provide energy saving methods and/or apparatuses of a mobile terminal.

According to an example embodiment, an energy saving method of a mobile terminal may include monitoring whether the mobile terminal loads a webpage data stream, determining webpage complexity of the webpage data stream, when the webpage data stream is loaded, determining one or more set parameter values, from among a plurality of parameter values of a set of regulation parameters, based on a correspondence relationship among the regulation parameters used for adjusting a frequency of a processor, the regulation parameters including a webpage complexity-related parameter, setting one or more set regulation parameters based on the one or more set parameter values, adjusting the frequency of the processor based on the one or more set regulation parameters, and loading the webpage data stream at the adjusted frequency such that the mobile terminal completes loading of the webpage data stream in a set time range with reduced energy consumption.

According to an example embodiment, an energy saving apparatus of a mobile terminal may include a monitoring unit configured to monitor whether the mobile terminal loads a webpage data stream, a webpage complexity determining unit configured to determine webpage complexity of the webpage data stream, when the webpage data stream is loaded, a set parameter value determining unit configured to determine one or more set parameter values, from among a plurality of parameter values of a set of regulation parameters, based on a correspondence relationship among the regulation parameters, used for adjusting a frequency of a processor, the regulation parameters including a webpage complexity-related parameter, a setting unit configured to set one or more set regulation parameters in accordance with the determined one or more set parameter values, and an adjusting unit configured to adjust the frequency of the processor based on the one or more set regulation parameters and load the webpage data stream at the adjusted frequency such that the mobile terminal completes loading of the webpage data stream in a set time range while reducing energy consumption According to an example embodiment, an energy saving apparatus of a mobile terminal may include a memory configured to store computer-readable instructions, and one or more processors configured to execute the computer-readable instructions such that the one or more processors are configured to monitor whether the mobile terminal loads a webpage data stream, determine webpage complexity of the webpage data stream, when the webpage data stream is loaded, determine one or more set parameter values, from among a plurality of parameter values of a set of regulation parameters, based on a correspondence relationship among the regulation parameters used for adjusting a frequency of a processor, based on the webpage complexity, the regulation parameters including a webpage complexity-related parameter, set one or more set regulation parameters in accordance with the determined one or more set parameter values, adjust the frequency of the processor based on the one or more set regulation parameters, and load the webpage data stream at the adjusted frequency such that the mobile terminal completes loading of the webpage data stream in a set time range with reduced energy consumption.

In an energy saving method and apparatus of a mobile terminal according to an example embodiment of the present disclosure, an one or more set parameter values of a set of regulation parameters used for adjusting a frequency of a processor may be determined according to webpage complexity, and the frequency of the processor may be indirectly adjusted by setting one or more set regulation parameters in accordance with the one or more set parameter values, and with regard to the method and the apparatus, applicability is wide, precision is high, and an energy saving effect is good.

Furthermore, in a situation in which the regulation parameter includes a delay time parameter used for adjusting the frequency, for example, in a system based on "Linux", a regulation parameter "CPUFreq governor" may include a delay time "above_hispeed_delay" used for adjusting the frequency. In a process of loading a webpage data stream at a frequency adjusted in accordance with the one or more set regulation parameters, when the frequency is desired to be increased quickly, then in an energy saving method and apparatus of a mobile terminal according to some example embodiments of the present disclosure, the frequency may be adjusted immediately after the delay time used for adjusting the frequency.

Additional aspects and/or advantages of the present disclosure will be set forth in part in the following description and, in part, will be apparent from the description, or may be known through implementation of the present disclosure.

BRIEF DESCRIPTION OF THE DRAWINGS

The above and other purposes, features, and advantages of the present disclosure will become more apparent from the following detailed description taken in conjunction with the accompanying drawings, in which.

DETAILED DESCRIPTION

The example embodiment of the present disclosure will be illustrated below with reference to the accompanying drawings.

Figure 1:
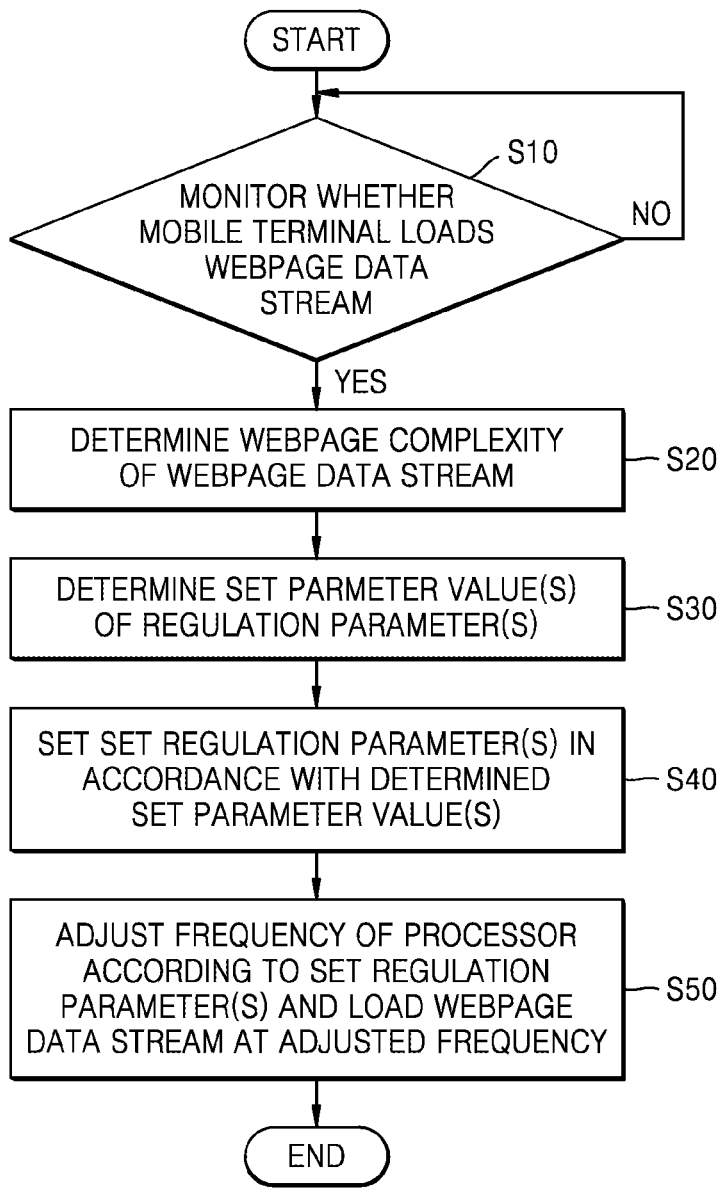
FIG. 1 illustrates a flowchart of an energy saving method of a mobile terminal according to an example embodiment of the present disclosure.

FIG. 1 illustrates a flowchart of an energy saving method of a mobile terminal according to an example embodiment of the present disclosure. The mobile terminal is an electronic apparatus which can access the Internet for information browsing on the Internet (e.g., a smart phone, a personal computer, a panel computer, a game console, or a digital multi-media player). The energy saving method of the mobile terminal according to the example embodiment of the present disclosure may be implemented in a system of the mobile terminal, or in a browser application installed in the mobile terminal.

Referring to FIG. 1, in Step S10, whether the mobile terminal loads a webpage data stream may be monitored. Here, whether the mobile terminal is about to load a webpage data stream may be monitored. For example, whether the mobile terminal has a hypertext markup language (HTML) request may be monitored, an indication that a webpage data stream is about to be loaded may be issued.

Here, in a situation in which the energy saving method is implemented in a system of the mobile terminal, in Step S10, whether a foreground application of the mobile terminal loads a webpage data stream may be monitored. In a situation in which the energy saving method is implemented in a browser application installed in the mobile terminal, in Step S10, whether the browser application loads a webpage data stream may be monitored.

When a webpage data stream is loaded, Step S20 is performed, and when no webpage data stream is loaded, Step S10 may be re-iterated.

In Step S20, webpage complexity of the webpage data stream may be determined. The webpage complexity may refer to complexity of a data included in the webpage data stream. The webpage complexity may reflect loading time of the webpage data stream and/or energy consumption of loading the webpage data stream. In a situation in which other factors are not changed, the higher the webpage complexity is, the longer the loading time is, and the lower the webpage complexity is, the shorter the loading time is. In a situation in which other factors are not changed, the higher the webpage complexity is, the higher the energy consumption is, and the lower the webpage complexity is, the lower the energy consumption is.

Here, the webpage complexity may be determined according to (or based on) information such as a size of the webpage data stream and/or a type of a label included in the webpage data stream. The label may indicate a collective name of content included in the webpage data stream. The type of the label may be divided into, for example, a character, a picture, an animation, and a video. For example, the webpage complexity may be determined according to at least one of the following items: a size of the webpage data stream, a number of types of a label included in the webpage data stream, a total number of the labels, the types of the labels included in the webpage data stream, a number of each of the types, and/or a size of each type of the label. For example, the webpage complexity may be a matrix, and each one of the at least one of the above items may be a component of the matrix.

In Step 30, one or more parameter values (e.g., desired parameter values(s)) of one or more regulation parameters used for adjusting a frequency of a processor may be determined according to (or based on) the determined webpage complexity. Here, with respect to different systems, the regulation parameters may be different. For example, with respect to a system based on "Linux", the regulation parameters include a "CPUFreq governor" parameter. The regulation parameter may be a set of parameters. In some example embodiments, the regulation parameters may include a delay time parameter used for adjusting the frequency. For example, the "CPUFreq governor" parameter may include the following parameters: "target_loads," "hispeed_freq," and "above_hispeed_delay,", and the parameter "above_hispeed_delay" may indicate the delay time parameter used for adjusting the frequency.

Here, the one or more set parameter values may refer to one or more values of the one or more regulation parameters to make the mobile terminal complete the loading of the webpage data stream in a desired (or alternatively, predetermined) time range with reduced energy consumption. In other words, when the regulation parameters are set to have the one or more set parameter values, the mobile terminal may complete the loading of the webpage data stream in the desired (or alternatively, predetermined) time range with reduced energy consumption.

Here, the one or more set parameter values may be determined from a plurality of desired (or alternatively, predetermined) parameter values of the regulation parameters, according to (or based on) a correspondence relationship among a webpage complexity-related parameter, an energy consumption-related parameter, a webpage loading time-related parameter, and parameter values of the regulation parameters.

For example, energy consumption and webpage loading time respectively corresponding to the plurality of desired (or alternatively, predetermined) parameter values of the regulation parameters may be determined according to (or based on) the determined webpage complexity. For example, one parameter value from among the plurality of desired (or alternatively, predetermined) parameter values, of which a corresponding webpage loading time in the desired (or alternatively, predetermined) time range and/or corresponding energy consumption have values approaching their lowest levels, may be determined as the one or more set parameter values. In a situation in which the one or more regulation parameters include multiple parameters, the plurality of one or more set (or alternatively, desired or predetermined) parameter values of the regulation parameters may be multiple combinations of the one or more set (or alternatively, desired or predetermined) parameter values of the multiple parameters included in the regulation parameters. The energy consumption and the webpage loading time corresponding to the one or more (or alternatively, desired or predetermined) parameter value of the regulation parameters may indicate energy consumption and time expended by the mobile terminal to complete the loading of the webpage data stream, after the regulation parameters are set in accordance with the one or more set (or alternatively, desired or predetermined) parameter value of the regulation parameters.

For example, the one or more set parameter values of the regulation parameters may be determined from the plurality of desired (or alternatively, predetermined) parameter values according to a desired (or alternatively, predetermined) function and the determined webpage complexity, and the desired (or alternatively, predetermined) function may refer to the correspondence relationship among the parameter values of the regulation parameters, the webpage complexity, the energy consumption, and/or the webpage loading time.

Here, the desired (or alternatively, predetermined) function may be a regression equation or another type of function. The desired (or alternatively, predetermined) function may be obtained by training according to a known data, or may be obtained in another way.

For example, the regression equation may be obtained by training according to a known parameter values of the regulation parameters, known webpage complexity, and known energy consumption and webpage loading time corresponding to the known parameter values of the regulation parameters. Here, the above known data may be a history data obtained in a process of loading the webpage data stream previously, and may also be a test data obtained in a test process of loading a webpage data stream which is performed to obtain the regression equation by training.

Here, the regression equation may be various types of equations. For example, the regression equation may be a vector supporting regression equation supporting. The vector supporting regression equation may be obtained through training by using a vector supporting regression algorithm according to the above known data. The vector supporting regression algorithm may improve precision of forecasting the energy consumption and the webpage loading time based on the above known data.

In Step S40, one or more set regulation parameters (e.g., desirable regulation parameter(s)) may be set in accordance with the determined one or more set parameter values. For example, the one or more set regulation parameters may be set through an interface for setting the one or more set regulation parameters in accordance with the determined one or more set parameter values. For example, with regard to a system based on "Linux", the "CPUFreq governor" parameter may be set in accordance with the determined one or more set parameter value (e.g., the parameters such as "target_loads," "hispeed_freq," and "above_hispeed_delay").

In Step S50, the frequency of the processor may be adjusted according to (or based on) the one or more set regulation parameters, and the webpage data stream may be loaded at the adjusted frequency. Here, after setting the one or more set regulation parameters in accordance with the determined one or more set parameter values, a system may adjust the frequency of the processor according to the one or more set regulation parameters and a desired (or alternatively, predetermined) strategy, and then load the webpage data stream according to the adjusted frequency so that the load of the webpage data stream is completed in a desired (or alternatively, predetermined) time range with lower energy consumption. For example, with regard to a system based on "Linux", after the "CPUFreq governor" parameter may be set in accordance with the determined one or more set parameter values, the frequency of the processor may be adjusted in accordance with, for example, the set "CPUFreq governor" parameter and a "Linux" kernel power management mechanism.

In another example embodiment, a function of the energy saving method of the mobile terminal may be enabled or disabled according to an operation of a user. For example, when the function is enabled, the mobile terminal may perform the load of the webpage data stream in accordance with the energy saving method, and when the function is disabled, the mobile terminal may perform the load of the webpage data stream in accordance with a default setting of the system. A widget used for enabling or disabling the function of the energy saving method may be provided in an operation interface of the mobile terminal. For example, a button used for enabling or disabling the function of the energy saving method may be provided on a setting interface of the mobile terminal.

Figure 2:
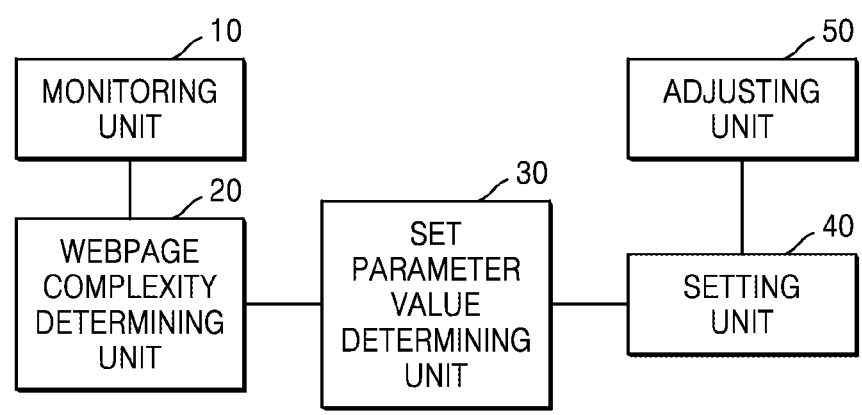
FIG. 2 illustrates a block diagram of an energy saving apparatus of a mobile terminal according to an example embodiment of the present disclosure.

FIG. 2 illustrates a block diagram of an energy saving apparatus of a mobile terminal according to an example embodiment of the present disclosure. The mobile terminal is an electronic apparatus which may access the Internet for information browsing on the Internet. The electronic device may include a smart phone, a personal computer, a panel computer, a game console, a digital multi-media player, and etc. An energy saving apparatus of a mobile terminal according to an example embodiment of the present disclosure may be implemented in a system of the mobile terminal, or may be implemented in a browser application installed in the mobile terminal. The energy saving apparatus of the mobile terminal according to some example embodiments of the present disclosure may include a monitoring unit 10, a webpage complexity determining unit 20, a set parameter value determining unit 30, a setting unit 40, and an adjusting unit 50.

The monitoring unit 10 may monitor whether the mobile terminal loads a webpage data stream. Here, the monitoring unit 10 monitors whether the mobile terminal is about to load a webpage data stream. For example, the monitoring unit 10 may monitor whether the mobile terminal has a hypertext markup language (HTML) request, and when an HTML request is monitored, then an indication that a webpage data stream is about to be loaded is issued.

Here, in a situation in which the energy saving apparatus is implemented in a system of the mobile terminal, the monitoring unit 10 may monitor whether a foreground application of the mobile terminal loads a webpage data stream. In a situation in which the energy saving apparatus is implemented in a browser application installed in the mobile terminal, the monitoring unit 10 may monitor whether the browser application loads a webpage data stream.

When a webpage data stream is loaded, the webpage complexity determining unit 20 may determine webpage complexity of the webpage data stream. When loading of the webpage data stream is not monitored, the monitoring unit 10 may continually monitor (e.g., reiterate the monitoring as to) whether the mobile terminal loads a webpage data stream.

The webpage complexity may refer to complexity of a data included in the webpage data stream. The webpage complexity may reflect loading time of the webpage data stream and/or energy consumption of loading the webpage data stream. In a situation in which other factors are not changed, the higher the webpage complexity is, the longer the loading time is. and the lower the webpage complexity is, the shorter the loading time is. In a situation in which other factors are not changed, the higher the webpage complexity is, the higher the energy consumption is, and the lower the webpage complexity is, the lower the energy consumption is.

Here, the webpage complexity determining unit 20 may determine the webpage complexity according to (or based on) information such as a size of the webpage data stream and/or a type of a label included in the webpage data stream. The label may indicate a collective name of content included in the webpage data stream. The type of the label may be divided into, for example, a character, a picture, an animation, and a video. For example, the webpage complexity determining unit 20 may determine the webpage complexity according to at least one of the following items: a size of the webpage data stream, a number of a type of a label included in the webpage data stream, a total number of the label, a type of the label included in the webpage data stream, a number of each type of the label, and/or a size of each type of the label. For example, the webpage complexity may be a matrix, and each one of the at least one of the above items may be a component of the matrix.

The set parameter value determining unit 30 may determine one or more parameter values (e.g., desirable regulation value(s)) of one or more regulation parameters used for adjusting a frequency of a processor according to (or based on) the determined webpage complexity. Here, with regard to different systems, the one or more regulation parameter may be different. For example, with regard to a system based on "Linux," the regulation parameters may include a "CPUFreq governor" parameter. In some example embodiments, the one or more regulation parameters may include a delay time parameter used for adjusting the frequency. For example, the "CPUFreq governor" parameter may include the following parameters: "target_loads," "hispeed_freq," "above_hispeed_delay," and the parameter "above_hispeed_delay" may indicate the delay time parameter used for adjusting the frequency. Here, the one or more set parameter values may refer to one or more values of the one or more regulation parameters to make the mobile terminal complete the loading of the webpage data stream in a desired (or alternatively, predetermined) time range with reduced energy consumption. In other words, after the regulation parameter is set to have the one or more set parameter values, the mobile terminal may complete the loading of the webpage data stream in the desired (or alternatively, predetermined) time range with reduced energy consumption.

Here, the one or more set parameter values determining unit 30 may determine the one or more set parameter values from a plurality of desired (or alternatively, predetermined) parameter values of the regulation parameter, according to a correspondence relationship among the determined webpage complexity, energy consumption, and webpage loading time, and parameter values of the regulation parameters.

For example, the set parameter value determining unit 30 may determine energy consumption and webpage loading time respectively corresponding to the plurality of desired (or alternatively, predetermined) parameter values of the regulation parameters according to the determined webpage complexity. Further, the set parameter value determining unit 30 may determine one or more set (or alternatively, predetermined) parameter value from among the plurality of desired (or alternatively, predetermined) parameter values, of which a corresponding webpage loading time in the (or alternatively, predetermined) time range and/or corresponding energy consumption have values approaching their lowest levels may be determined as the one or more set parameter values. In a situation in which the one or more regulation parameters includes multiple parameters, the plurality of one or more set (or alternatively, desired or predetermined) parameter values of the regulation parameters may be multiple combinations of the one or more set (or alternatively, desired or predetermined) parameter values of the multiple parameters included in the regulation parameters. The energy consumption and the webpage loading time corresponding to the one or more set (or alternatively, desired or predetermined) parameter value of the regulation parameter may indicate energy consumption and time expended by the mobile terminal to complete the loading of the webpage data stream, after the regulation parameter is set in accordance with the one or more set (or alternatively, desired or predetermined) parameter value of the regulation parameter.

For example, the set parameter value determining unit 30 may determine the one or more set parameter values of the regulation parameters from the plurality of desired (or alternatively, predetermined) parameter values according to a desired (or alternatively, predetermined) function and the determined webpage complexity, and the desired (or alternatively, predetermine) function may refer to a correspondence relationship among parameter values of the regulation parameters, a webpage complexity-related parameter, an energy consumption-related parameter, and/or a webpage loading time-related parameter.

Here, the desired (or alternatively, predetermined) function may be a regression equation or another type of function. The desired (or alternatively, predetermined) function may be obtained by training according to a known data, or may be obtained in another way.

For example, the apparatus may further include a training unit (not shown). The training unit may obtain the regression equation by training according to a known parameter values of the regulation parameters, known webpage complexity, and known energy consumption and webpage loading time corresponding to the known parameter value of the regulation parameter. Here, the above known data may be a history data obtained in a process of loading a webpage data stream previously, and may also be a test data obtained in a test process of loading a webpage data stream which is performed to obtain the regression equation by training.

Here, the regression equation may be various types of equations. For example, the regression equation may be a vector supporting regression equation. The vector supporting regression equation may be obtained through training by using a vector supporting regression algorithm and according to the above known data. The vector supporting regression algorithm may improve precision of forecasting the energy consumption and the webpage loading time based on the above known data.

The setting unit 40 may set the one or more set regulation parameters (e.g., desirable regulation parameter(s)) in accordance with the determined one or more set parameter values. Here, the setting unit 40 may set the one or more set regulation parameters through an interface for setting the one or more set regulation parameter in accordance with the determined one or more set parameter value. For example, with regard to a system based on "Linux," the setting unit 40 may set the "CPUFreq governor" parameter in accordance with the determined one or more set parameter value(s) (e.g., "target_loads," "hispeed_freq," and/or "above_hispeed_delay").

The adjusting unit 50 may adjust the frequency of the processor according to the set one or more regulation parameters, and load the webpage data stream at the adjusted frequency. Here, after the setting unit 40 sets the one or more set regulation parameters in accordance with the determined one or more set parameter values, the adjusting unit 50 may adjust the frequency of the processor according to the set regulation parameter and a desired (or alternatively, predetermined) strategy, and then load the webpage data stream according to the adjusted frequency, so that the load of the webpage data stream is completed in a desired (or alternatively, predetermined) time range with reduced energy consumption. For example, with regard to a system based on "Linux," after the setting unit 40 sets the "CPUFreq governor" parameter in accordance with the determined one or more set parameter value, the adjusting unit 50 may adjust the frequency of the processor in accordance with, for example, the set "CPUFreq governor" parameter and a "Linux" kernel power management mechanism.

In another example embodiment, a function of the energy saving apparatus of the mobile terminal may be enabled or disabled according to an operation of a user. For example, when the function is enabled, the mobile terminal may perform the load of the webpage data stream in accordance with a way in the energy saving apparatus, and when the function is disabled, the mobile terminal may perform the load of the webpage data stream in accordance with a default setting of the system. A widget used for enabling or disabling the function of the energy saving apparatus may be provided in an operation interface of the mobile terminal. For example, a button used for enabling or disabling the function of the energy saving apparatus may be provided in a setting interface of the mobile terminal.

In some example embodiments, the monitoring unit 10, webpage complexity determining unit 20, desirable parameter value determining unit 30, setting unit 40, and adjusting unit 50 may be implemented by a memory (which is configured to store computer-readable instructions) and one or more processors (which is configured to execute the computer-readable instructions such that the one or more processors are configured to perform the functions of the respective units).

In an energy saving method and apparatus of a mobile terminal according to some example embodiments of the present disclosure, an desirable parameter value of a regulation parameter used for adjusting a frequency of a processor may be determined according to webpage complexity, and the frequency of the processor may be indirectly adjusted based on the regulation parameter set in accordance with the desirable parameter value. Thus, the mobile terminal may be implemented to have a wider applicability, enhanced precision, and/or improved energy efficiency.

Furthermore, the regulation parameter may include a delay time parameter used for adjusting the frequency. For example, in a system based on "Linux", a regulation parameter "CPUFreq governor" may include delay time "above_hispeed_delay" used for adjusting the frequency. In a process of loading a webpage data stream at a frequency adjusted in accordance with the set regulation parameter, if the frequency us desired to be increased quickly, then in an energy saving method and apparatus of a mobile terminal according to some example embodiments of the present disclosure, the frequency may be adjusted immediately after the delay time used for adjusting the frequency. In the related art, however, the frequency can only be adjusted after the load of the webpage data stream is finished. Thus, a response speed of the energy saving method and/or apparatus of a mobile terminal according to some example embodiments of the present disclosure may be faster than the energy saving method and/or apparatus of a mobile terminal according to the related art.

Furthermore, an energy saving method of a mobile terminal according to the present disclosure may be embodied as a computer readable code on a computer readable recording medium. The computer readable recording medium may be any data storage device that can store data which can be thereafter read by a computer system. Examples of the computer readable recording medium include a read-only memory (ROM), a random-access memory (RAM), a CD-ROM, a magnetic tape, a floppy disk, an optical data storage device, and a carrier wave (such as data transmission through the Internet via a wired or wireless transmission path). The computer readable recording medium may be distributed over a network coupled computer system so that the computer readable code is stored and executed in a distributed fashion. Furthermore, a functional program, a code, and a code segment for accomplishing the present disclosure can be easily construed by a common programmer having ordinary skill in the art related to the present disclosure within the scope of the present disclosure.

Furthermore, a respective unit in an energy saving apparatus of a mobile terminal according to an example embodiment of the present disclosure may be implemented completely by hardware, and those skilled in the art may implement the respective unit, for example, by using a field programmable gate array (FPGA) or an application specific integrated circuit (ASIC) according to a process performed by the defined respective unit. The respective unit may further be implemented by a combination of hardware and software, or the respective unit may also be implemented completely by a computer program in a software way, for example, be implemented as a respective module in an application installed in a mobile terminal and used for saving energy.

While the present disclosure have been presented and described with reference to the example embodiments in detail, it should be understood by those skilled in the art that various changes in form and details may be made herein without departing from the spirit and scope of the present disclosure which is defined by the appended claims.

What is claimed is:

1. An energy saving method of a mobile terminal, comprising:
    monitoring whether the mobile terminal loads a webpage data stream;
    determining webpage complexity of the webpage data stream, when the webpage data stream is loaded;
    determining one or more set parameter values, from among a plurality of parameter values of a set of regulation parameters, based on a correspondence relationship among the regulation parameters used for adjusting a frequency of a processor, the regulation parameters including a webpage complexity-related parameter;

setting one or more set regulation parameters based on the one or more set parameter values;

adjusting the frequency of the processor based on the one or more set regulation parameters; and loading the webpage data stream at the adjusted frequency such that the mobile terminal completes loading of the webpage data stream in a set time range with reduced energy consumption, wherein the determining webpage complexity comprises determining the webpage complexity based on at least one of a size of the webpage data stream, a number of types of labels included in the webpage data stream, a total number of the labels, the types of the labels included in the webpage data stream, a number of each of the types, or a size of each of the types.

2. The method of claim 1, wherein the regulation parameters further include an energy consumption-related parameter, and a webpage loading time-related parameter.

3. The method of claim 1, wherein the monitoring comprises monitoring whether a foreground application of the mobile terminal loads the webpage data stream.

4. The method of claim 1, wherein the regulation parameters comprise a delay time used for adjusting the frequency.

5. The method of claim 4, wherein the adjusting the frequency includes increasing the frequency immediately after the delay time.

6. The method of claim 1, wherein the determining one or more set parameter values includes determining the one or more set parameter values, from among the plurality of parameter values of the set of regulation parameters, according to a function and the determined webpage complexity, the function representing the correspondence relationship among the parameter values of the regulation parameters, the determined webpage complexity, energy consumption level, and/or a webpage loading time.

7. An energy saving apparatus of a mobile terminal, comprising:

a monitoring unit configured to monitor whether the mobile terminal loads a webpage data stream;

a webpage complexity determining unit configured to determine webpage complexity of the webpage data stream, when the webpage data stream is loaded;

a set parameter value determining unit configured to determine one or more set parameter values, from among a plurality of parameter values of a set of regulation parameters, based on a correspondence relationship among the regulation parameters, used for adjusting a frequency of a processor, the regulation parameters including a webpage complexity-related parameter;

a setting unit configured to set one or more set regulation parameters in accordance with the determined one or more set parameter values; and an adjusting unit configured to, adjust the frequency of the processor based on the one or more set regulation parameters, and load the webpage data stream at the adjusted frequency such that the mobile terminal completes loading of the webpage data stream in a set time range while reducing energy consumption, wherein the webpage complexity determining unit determines the webpage complexity based on at least one of a size of the webpage data stream, a number of types of labels included in the webpage data stream, a total number of the labels, the types of the labels included in the webpage data stream, a number of each of the types, or a size of each of the types.

8. The apparatus of claim 7, wherein the regulation parameters further include an energy consumption-related parameter, and a webpage loading time-related parameter.

9. The apparatus of claim 7, wherein the monitoring unit is configured to monitor whether a foreground application of the mobile terminal loads the webpage data stream.

10. The apparatus of claim 7, wherein the regulation parameters comprises a delay time used for adjusting the frequency.

11. The apparatus of claim 10, wherein the adjust unit is configured to adjust the frequency of the processor immediately after the delay time.

12. The apparatus of claim 7, wherein the set parameter value determining unit is configured to determine the one or more set parameter values, from among the plurality of parameter values of the set of regulation parameters, according to a function and the determined webpage complexity, the function representing the correspondence relationship among the parameter values of the regulation parameters, the determined webpage complexity, energy consumption level, and/or a webpage loading time.

13. An energy saving apparatus of a mobile terminal, comprising:

a memory configured to store computer-readable instructions; and one or more processors configured to execute the computer-readable instructions such that the one or more processors are configured to, monitor whether the mobile terminal loads a webpage data stream, determine webpage complexity of the webpage data stream, when the webpage data stream is loaded, determine one or more set parameter values, from among a plurality of parameter values of a set of regulation parameters, based on a correspondence relationship among the regulation parameters used for adjusting a frequency of a processor, the regulation parameters including a webpage complexity-related parameter, set one or more set regulation parameters in accordance with the determined one or more set parameter values, adjust the frequency of the processor based on the one or more set regulation parameters, and load the webpage data stream at the adjusted frequency such that the mobile terminal completes loading of the webpage data stream in a set time range with reduced energy consumption, wherein the one or more processors are configured to determines the webpage complexity based on at least one of a size of the webpage data stream, a number of types of labels included in the webpage data stream, a total number of the labels, the types of the labels included in the webpage data stream, a number of each of the types, or a size of each of the types.

14. The apparatus of claim 13, wherein the regulation parameters further include an energy consumption-related parameter, and a webpage loading time-related parameter.

15. The apparatus of claim 13, wherein the types include a character, a picture, an animation, and a video, and each of the labels indicates a collection of content included in the webpage data stream.

16. The apparatus of claim 13, wherein the one or more processors are configured to monitors whether a foreground application of the mobile terminal loads the webpage data stream.

17. The apparatus of claim 13, wherein the regulation parameters comprises a delay time used for adjusting the frequency, and the one or more processors are configured to adjust the frequency immediately after the delay time.

18. The apparatus of claim 13, wherein the one or more processors are configured to monitors is configured to determine the one or more set parameter values, from among the plurality of parameter values of the set of regulation parameters, according to a function and the determined webpage complexity, the function representing the correspondence relationship among the parameter values of the regulation parameters, the determined webpage complexity, energy consumption level, and/or a webpage loading time.

\* \* \* \* \*